United States Patent Office 3,474,997
Patented Oct. 28, 1969

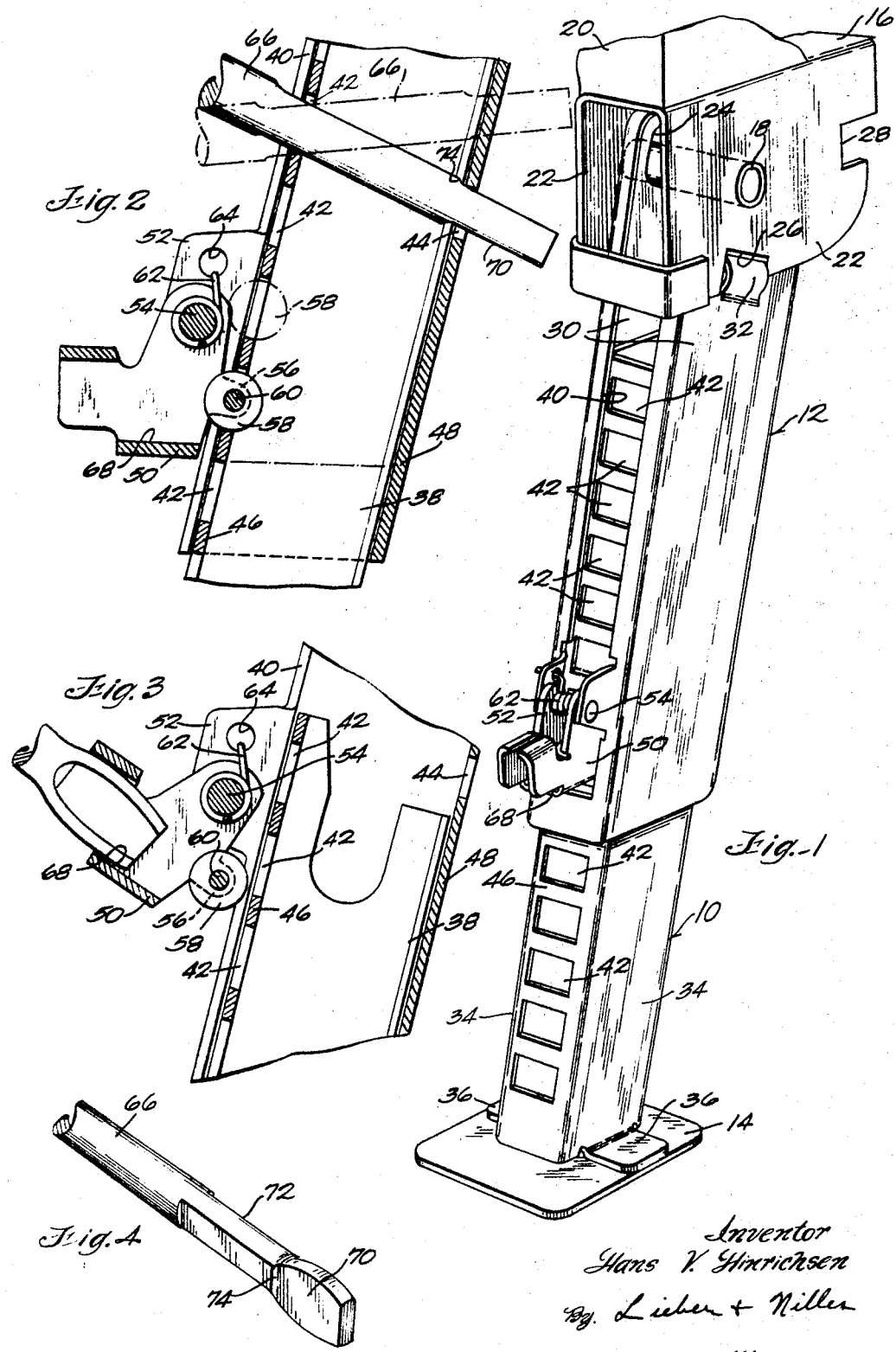

3,474,997
ADJUSTABLE LOAD SUPPORT
Hans V. Hinrichsen, Milwaukee, Wis., assignor to The Fulton Company, West Allis, Wis., a corporation of Wisconsin
Filed Aug. 30, 1967, Ser. No. 664,360
Int. Cl. F16m *13/00, 11/28;* E04g *25/04*
U.S. Cl. 248—354                9 Claims

ABSTRACT OF THE DISCLOSURE

An adjustable load support for use in stabilizing trailers or the like and having telescopically coacting leg members extendable by means of a handle engageable with notches in certain walls of the leg members to extend the same, one of the leg members being provided with a latch for holding the leg members in adjusted positions and releasable by means of the handle to permit retraction of the leg members.

BACKGROUND

It is, of course, common practice for trailer owners to uncouple their trailers from the towing vehicle upon reaching a destination so that the vehicle may be used for transportation while the trailer is used for storage and/or housing. During such use, it is generally desirable to provide means for leveling and stabilizing the trailer and for maintaining the same in such condition. Such leveling and stabilizing devices commonly consist of a supporting prop or stand attached to the trailer and adapted to support the same in a stabilized position when detached from the vehicle. These supporting devices not only serve to stabilize the trailer but may also be used to facilitate coupling and uncoupling operations and the like.

Since trailers are supplied in various sizes and are of diverse styles and types for use under varying conditions, it is desirable that the stabilizing devices be rendered adjustable. Accordingly, it has been heretofore proposed to provide load supports of this general type which are adjustable to compensate for such conditions as varying trailer and/or wheel sizes, desired load levels, uneven terrain and the like. It has also been heretofore proposed to provide for storage positioning of the stabilizer or support when not in use.

However, for the most part, trailer stabilizers or load supports heretofore commercially available have been difficult to adjust, requiring a number of time-consuming operations. In other instances, these devices have been undesirably complicated and costly, insecure, or of restricted application and use.

SUMMARY

Accordingly, an object of the present invention is to provide an improved adjustable load support or stabilizer which satisfactorily meets all of the aforesaid requirements and obviates the disadvantages attendant prior devices of this general type.

Another object of the invention is to provide an improved load support, especially adaptable as a trailer tongue stand or stabilizer, which is readily adjustable to different lengths and which is quickly retracted with maximum safety and convenience.

A further object of this invention is to provide an improved adjustable load support which is highly flexible in its adaptations, extremely sturdy, safe and foolproof in operation and use, and capable of withstanding rough usage.

These and other objects and advantages of the present invention will become apparent from the following detailed description.

THE DRAWINGS

A clear conception of the features constituting the present improvement and of the mode of operation and use of a typical trailer stabilizer embodying the invention may be had by referring to the drawing accompanying and forming a part of this specification wherein like reference characters designate the same or similar parts in the various views.

FIGURE 1 is a perspective view of a typical adjustable load support used as a trailer stabilizer and embodying the present invention;

FIGURE 2 is a fragmentary longitudinal section through the elevating portion and the latch of the load supports and showing the handle applied to extend the leg members;

FIGURE 3 is another fragmentary longitudinal section but showing the handle in position to release the latch; and FIGURE 4 is a perspective view of the end portion of the handle as used for extension and retraction of the leg members.

DETAILED DESCRIPTION

While the invention has been shown and described herein as being embodied in a load support especially intended for use in stabilizing trailers or the like, it is not intended to thereby unnecessarily limit the use thereof by such restricted embodiment, and it is also contemplated that the broadest possible interpretation consistent with the disclosure will be given to the various description terms used herein.

Referring to the drawings, the adjustable load support shown therein as embodying the invention comprises generally, a pair of nested telescopically coacting inner and outer leg members 10, 12 respectively shown as being of rectilinear cross-sections. In the embodiment illustrated, the inner leg member 10 is extendable downwardly and is provided with a ground engaging base plate 14 at its lower end. In turn, the upper leg member 12 has a mounting bracket 16 pivotally secured thereto as by means of a pivot pin 18.

The bracket 16 may be of well known construction adapted for attachment to a corner portion of a trailer, or to a trailer tongue or the like in a known manner. Similar mounting brackets are shown, for example in United States Patents No. 2,571,390 and No. 2,965,392 and comprise generally, an inverted channel bracket 16 attachable to the desired trailer portion 20 with the pivot pin 18 extending through axially alined holes in the depending side walls 22 of the channel bracket 16 and through alined elongated slots 24 in the opposed side walls 30 of the upper leg member 12, the leg member being urged by spring means (not shown) toward the pivot pin 18 and the side walls 22 of the bracket being formed with lower and upper sets of peripheral notches 26, 28 with the side walls 30 of the leg member 12 being provided with lugs 32 alternately and selectively cooperable with the notches 26, 28 to interchangeably retain the leg members in lowered position as shown or in an inoperative elevated position.

The ground engageable base plate 14 may be secured to the lower end of the leg member 10 in any suitable manner as by welding or the like. For example, the side walls 34 may be formed with extending tabs 36 bent outwardly to provide ears to which the base plate 14 may be secured.

In accordance with the invention, each of the leg members 10, 12 is formed with an elongated slot or opening 38, 40 extending along one side of the respective leg member between the walls 34, 30 thereof and the inner leg member 10 is formed with a plurality of apertures or notches 42 in its opposite wall 46 while the outer leg member 12 has at least one aperture or notch 44 in its opposite wall. The leg members are nested or assembled with the longitudinal opening 38 of the lower or inner leg member 10 disposed adjacent the apertured or notched wall 48 of the upper leg member 12 and with the longitudinal opening 40 of the upper leg member 12 adjacent the apertured or notched wall 46 of the lower leg member 10.

To retain the leg members 10, 12 in assembled condition and to index and hold the same upon extension while permitting retraction thereof, a releasable latch is provided. As shown, this latch and release mechanism comprises, a socket member 50 mounted between outwardly projecting ears on lugs 52 formed on the outer leg member 12 on the longitudinally open side 40 thereof, the socket member 50 being mounted for swinging movement on the lugs 52 as by means of a pivot pin 54. The socket member 50 is formed with a pair of spaced ears on lugs 56 directed toward the longitudinal opening 40 of the outer leg member 12 and the adjacent notched wall 46 of the inner leg member, and a roller 58 is preferably rotatably mounted as by a pin 60 on the lugs 56 so as to engage the successive notches 42. The latch carrying socket member 50 is also constantly urged about its pivot 54 toward the notched wall 46 by a torsion spring 62 or the like coiled about the pin 54 and having its end engaged in an aperture 64 of one of the lugs 52. The spring 62 thus functions to prevent separation and/or displacement of the leg members 10, 12 except at the will and under the control of an operator.

To extend the leg members 10, 12 and to release the latch and permit retraction of the leg members when desired, an actuating handle 66 is provided. As shown in FIGURE 2, to extend the leg members 10, 12 to the desired height, the handle 66 is freely inserted through the opening 40 of the outer leg member 12 and a selected notch 42 of the inner leg member 10 past the longitudinal open side 38 thereof and into the notch 44 of the outer leg member. The handle 66 is thus fulcrumed on the wall 46 of the inner leg member 10 at the selected notch 42 and provides a lever which, when swung downwardly or counterclockwise as shown by means of broken lines in FIGURE 2, causes extension of the leg members in increments of one notch for each operation during which the roller latch rides over the wall 46 and into the successive notches 42 of the inner leg member 10.

As shown in FIGURE 3, the handle 66 may be interchangeably used to permit retraction of the leg members 10, 12. For such operation, it is only necessary to insert the end of the handle in the socket 68 of the member 50 and then swing the handle 66 upwardly or clockwise about its pivot 54 against the action of the spring 62. This causes complete withdrawal of the roller latch 58 from the notches 42, and the weight of the load will telescopically collapse the leg members 10, 12 and permit the same to be swung about the upper pivot 18 to ineffective substantially horizontal position.

As a practical matter, the wall 48 of the leg member 12 need only be provided with a single notch 44 while the wall 46 of the leg member 10 is provided with a plurality of equally spaced notches 42. Also, from the standpoint of safety and to insure proper usage of the handle lever 66, the notch 44 should preferably by of somewhat smaller size than the notches 42, and the handle 66 is then formed with an end portion having areas of two different reduced thicknesses, the outermost of which is reduced as by flattening the same, as at 70, to permit entry thereof into the smaller notch 44 of the outer leg member wall 48 and the adjacent portion of which is reduced to a lesser extent, as at 72, to permit entry thereof only into any selected one of the notches 42 of the inner leg member 10. This insures proper use of the handle 66 since only the reduced portion 70 thereof is receivable within notch 44 and the shoulder 74 between the portions 70 and 72 limits the extent to which the handle may be inserted for the jacking or extension operation.

I claim:

1. An adjustable load support comprising a pair of telescopically coacting inner and outer leg members, each of said leg members being formed with an opening extending longitudinally along one wall thereof and the inner leg member having a plurality of apertures in its opposite wall while the outer member has at least one aperture in its opposite wall, said leg members being nested with the longitudinally open wall of one disposed adjacent the apertured wall of the other, means on one of said leg members for securing the same to the load to be supported, a socket member pivotally mounted on the longitudinally open wall of the outer leg member for swinging movement toward and away from the inner leg member, a latch on said socket member engageable with the wall apertures of said inner leg member, and an actuating handle freely insertable through the longitudinal wall openings and selected wall apertures of both of said leg members and operable to extend said leg members upon movement of said handle in one direction, said handle also being insertable in said socket member and operable to retract said leg members upon movement of said handle in the other direction.

2. An adjustable load support according to claim 1, wherein means is provided for constantly resiliently urging the socket member toward the inner leg member whereby the latch automatically engages the wall apertures of said inner leg member.

3. An adjustable load support according to claim 1, wherein the latch is a roller journalled for rotation on the socket member and engageable with successive wall apertures of the inner leg member upon extension of the leg members by the handle.

4. An adjustable load support according to claim 1, wherein the means for securing the leg members to the load is mounted on the end of the outer leg member and a ground engaging base is provided on the end of the inner leg member remote from said local securing means.

5. An adjustable load support according to claim 1, wherein the wall apertures of the inner leg member are selectively engageable by the handle and successively engageable by the latch.

6. An adjustable load support according to claim 1, wherein the outer leg member is provided with a single wall aperture and the inner leg member is provided with a plurality of wall apertures of larger size than said single aperture, and the handle is formed with an end portion of reduced thickness to permit entry thereof into the single aperture of the outer leg member to a limited extent.

7. An adjustable load support according to claim 8, wherein the handle is formed with an end portion having areas of two different thicknesses, the outermost of which is such as to permit entry thereof into the single aperture of the outer leg member while the other area is such as to permit entry thereof into selected apertures of the inner leg member while prohibiting entry thereof into the single aperture of said outer leg member.

8. An adjustable load support according to claim 2, wherein the means for constantly urging the socket member toward the inner leg member is a spring of sufficient force to cause the latch to automatically engage successive wall apertures of said inner leg member while permitting the latch to ride over the wall between the apertures as the leg members are being extended.

9. An adjustable load support according to claim 8, wherein the latch is a roller mounted for rotation on the socket member and peripherally engaging the apertured wall of the inner leg member.

References Cited

UNITED STATES PATENTS 176,900   5/1876   Thurston _____ 254—105

FOREIGN PATENTS 59,658   1891   Germany.
778,624   7/1957   Great Britain.
780,936   8/1957   Great Britain.

ROY D. FRAZIER, Primary Examiner

F. DOMOTOR, Assistant Examiner